United States Patent
Blanchet et al.

(10) Patent No.: US 10,475,055 B2
(45) Date of Patent: Nov. 12, 2019

(54) AUTOMATED BUSINESS REVIEWS BASED ON PATRON SENTIMENT

(71) Applicant: Capital One Services, LLC, McLean, VA (US)

(72) Inventors: Steve Blanchet, Alexandria, VA (US); Zviad Aznaurashvili, McLean, VA (US); Hannes Jouhikainen, McLean, VA (US); Timur Sherif, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 6 days.

(21) Appl. No.: 15/895,380

(22) Filed: Feb. 13, 2018

(65) Prior Publication Data

US 2019/0251578 A1 Aug. 15, 2019

(51) Int. Cl.
*G06Q 10/00* (2012.01)
*G06Q 30/02* (2012.01)

(52) U.S. Cl.
CPC ..... *G06Q 30/0201* (2013.01); *G06Q 30/0282* (2013.01)

(58) Field of Classification Search
CPC ........... G06Q 30/0201; G06Q 30/0282; G06Q 30/02; G06Q 30/0224
See application file for complete search history.

(56) References Cited

U.S. PATENT DOCUMENTS

| | | | |
|---|---|---|---|
| 9,305,303 B2 | 4/2016 | Farlie | |
| 9,646,198 B2 | 5/2017 | Cunico et al. | |
| 2012/0191730 A1* | 7/2012 | Parikh | G06Q 30/0201 707/754 |
| 2014/0157294 A1* | 6/2014 | Chung | H04N 21/44218 725/10 |
| 2014/0314310 A1* | 10/2014 | Movellan | G06K 9/00302 382/155 |
| 2014/0337097 A1* | 11/2014 | Farlie | G06Q 30/0203 705/7.32 |

(Continued)

OTHER PUBLICATIONS

Yadav S. K., M. Bhushan and S. Gupta, "Multimodal sentiment analysis: Sentiment analysis using audiovisual format," 2015 2nd International Conference on Computing for Sustainable Global Development (INDIACom), New Delhi , 2015, pg. 1415-1419. (Year: 2015).*

*Primary Examiner* — William S Brockington, III
(74) *Attorney, Agent, or Firm* — DLA Piper LLP (US)

(57) ABSTRACT

Embodiments disclosed herein generally relate to a method and system of determining an overall sentiment of a facility. A computing system receives a video stream, including a plurality of frames, of one or more patrons in a facility over a first time period. The video stream includes data indicative of a sentiment of each of the one or more patrons. The computing system parses the plurality of frames to determine the sentiment of the patron based at least on audio and visual cues of the patron captured in the video stream during the first time period. The computing system aggregates one or more sentiments corresponding to the one or more patrons in a data set indicative of an overall sentiment of the facility. The computing system generates a sentiment value corresponding to the overall sentiment of the facility. The computing system outputs the overall sentiment of the facility.

18 Claims, 11 Drawing Sheets

(56) References Cited

U.S. PATENT DOCUMENTS

| | | | |
|---|---|---|---|
| 2015/0222586 A1 | 8/2015 | Ebersman et al. | |
| 2016/0012453 A1* | 1/2016 | Naqvi | H04W 4/029 705/7.29 |
| 2016/0042281 A1 | 2/2016 | Cunico et al. | |
| 2016/0110591 A1* | 4/2016 | Smith | G06K 9/00302 382/103 |
| 2016/0335252 A1* | 11/2016 | Brunet | G06F 17/2785 |
| 2019/0114689 A1* | 4/2019 | Wang | G06Q 30/0631 |

\* cited by examiner

AUTOMATED BUSINESS REVIEWS BASED ON PATRON SENTIMENT

BACKGROUND

The present disclosure generally relates to a method and a system for determining an overall sentiment of a facility.

When consumers consider becoming customers of a business, they often research the quality of the business. Consumers may consult friends and family to learn of a business' reputation through word of mouth. Consumers may also consult third parties that rate business. Some of these third parties use a business rating score that indicates the business' reputation. For example, when a consumer considers going to a new restaurant, the consumer may perform an Internet search to find reviews of the restaurant posted by other Internet users.

Businesses further rely on business rating scores to adjust a quality of service provided by the business. For example, by identifying weaknesses in the business' structure or service in reviews of the business posted by other Internet users, a certain business may address those weaknesses in an attempt to improve its business structure or service.

SUMMARY

Embodiments disclosed herein generally relate to a method and system of determining an overall sentiment of a facility. In one embodiment, a method is disclosed herein. A computing system receives a video stream, including a plurality of frames, of one or more patrons in a facility over a first time period. The video stream includes data indicative of a sentiment of each of the one or more patrons. For each patron in the video stream, the computing system parses the plurality of frames to determine the sentiment of the patron based at least on audio and visual cues of the patron captured in the video stream during the first time period. The computing system aggregates one or more sentiments corresponding to the one or more patrons in a data set indicative of an overall sentiment of the facility. The computing system generates a sentiment value corresponding to the overall sentiment of the facility based on the data set. The computing system outputs the overall sentiment of the facility based on the generated sentiment value.

In some embodiments, the sentiment of the patron comprises the attitude the patron is conveying toward the facility.

In some embodiments, in the method above, the computing system receives a second video stream including a second plurality of frames of one or more patrons in the facility over a second time period succeeding the first time period. The video stream includes data indicative of each of the one or more patrons over the second time period. For each patron in the second video stream, the computing system parses the second plurality of frames to determine the sentiment of the patron based at least on audio and visual cues of the patron captured in the second video stream during the second time period. The computing system aggregates one or more sentiments corresponding to the one or more patrons in a second data set indicative of an overall sentiment of the facility over the second time period. The computing system appends the second data set to an overall data set that includes at least the data set of one or more sentiments over the first time period. The computing system generates an updated sentiment value corresponding to an overall sentiment of the facility, spanning the first time period and the second time period, based on the appended data set. The computing system outputs the updated sentiment of the facility based on the generated updated sentiment value.

In some embodiments, for each patron in the video stream, parsing the plurality of frames to determine the sentiment of the patron based at least on audio and visual cues of the patron captured in the video stream during the first time period includes the computing system further parses the plurality of frames to identify one or more words spoken by evaluating one or more lip movements of the patron.

In some embodiments, for each patron in the video stream, parsing the plurality of frames to determine the sentiment of the patron based at least on audio and visual cues of the patron captured in the video stream during the first time period includes the computing system parsing the plurality of frames to identify one or more facial expressions of the patron by evaluation one or more facial movements of the patron.

In some embodiments, generating a sentiment value corresponding to the overall sentiment of the facility based on the data set includes the computing system adjusting the sentiment value based on at least one of a time of day, current weather conditions, current events, current day of the year, and type of facility.

In some embodiments, receiving a video stream comprising a plurality of frames of one or more patrons in a facility over a first time period, the video stream including data indicative of a sentiment of each of the one or more patrons, includes the computing system receiving a plurality of video streams. Each video stream of the plurality of video streams corresponds to a bounded location in the facility.

In some embodiments, for each patron in the video stream, parsing the plurality of frames to determine the sentiment of the patron based at least on audio and visual cues of the patron captured in the video stream during the first time period includes the computing system parsing the plurality of frames to identify one or more key terms relating to one or more dimensions of the facility.

In another embodiment, a method is disclosed herein. A computing system receives a video stream, including a plurality of frames, of one or more patrons in a facility over a first time period. The video stream includes data indicative of a sentiment of each patron over the first time period. For each patron in the video stream, the computing system parses the plurality of frames to determine the sentiment of the patron based at least on audio and visual cues of the patron captured in the video stream. The computing system appends the sentiment of each patron captured during the first time period to an overall data set indicative of an overall sentiment of the facility for a time preceding the first time period to generate an updated data set. The computing system generates a sentiment value corresponding to the overall sentiment of the facility based on the updated data set. The computing system outputs the overall sentiment of the facility based on the generated sentiment value.

In some embodiments, the sentiment of the patron comprises the attitude the patron is conveying toward the facility.

In some embodiments, for each patron in the video stream, parsing the plurality of frames to determine the sentiment of the patron based at least on audio and visual cues of the patron captured in the video stream during the first time period includes the computing system further parses the plurality of frames to identify one or more words spoken by evaluating one or more lip movements of the patron.

In some embodiments, for each patron in the video stream, parsing the plurality of frames to determine the sentiment of the patron based at least on audio and visual cues of the patron captured in the video stream during the first time period includes the computing system parsing the plurality of frames to identify one or more facial expressions of the patron by evaluation one or more facial movements of the patron.

In some embodiments, generating a sentiment value corresponding to the overall sentiment of the facility based on the data set includes the computing system adjusting the sentiment value based on at least one of a time of day, current weather conditions, current events, current day of the year, and type of facility.

In some embodiments, receiving a video stream comprising a plurality of frames of one or more patrons in a facility over a first time period, the video stream including data indicative of a sentiment of each of the one or more patrons, includes the computing system receiving a plurality of video streams. Each video stream of the plurality of video streams corresponds to a bounded location in the facility.

In some embodiments, for each patron in the video stream, parsing the plurality of frames to determine the sentiment of the patron based at least on audio and visual cues of the patron captured in the video stream during the first time period includes the computing system parsing the plurality of frames to identify one or more key terms relating to one or more dimensions of the facility.

In some embodiments, the one or more dimensions correspond to at least one of food, atmosphere, and service of the facility.

In another embodiment, a system is disclosed herein. The system includes a processor and a memory. The processor is in communication with one or more input devices. The processor receives a data stream indicative of a sentiment of each of the one or more patrons in a facility. The memory has programming instructions stored thereon. The programming instructions, which, when executed by the processor, performs an operation. The operation includes, for each patron in the video stream, parsing the data stream to determine the sentiment of the patron based at least on audio and visual cues of the patron captured in the video stream during the first time period. The operation further includes aggregating one or more sentiments corresponding to the one or more patrons in a data set indicative of the overall sentiment of the facility. The operation further includes generating a sentiment value corresponding to the overall sentiment of the facility based on the data set. The operation further includes outputting the overall sentiment of the facility based on the generated sentiment value.

In some embodiments, the sentiment of the patrons is an attitude the patron is conveying toward the facility.

In some embodiments, the one or more input devices positioned in the facility includes a mobile device of the patron, while the patron is at the facility.

In some embodiments, the operation may further include receiving a second data stream of one or more patrons in the facility over a second time period succeeding the first time period. The data stream includes data indicative of a sentiment of each of the one or more patrons over the second time period. The operation may further include, for each patron in the second data stream, parsing the second data stream to determine the sentiment of the patron based at least on audio and visual cues of the patron captured in the second data stream. The operation may further include aggregating one or more sentiments corresponding to the one or more patrons in a second data set indicative of the overall sentiment of the facility. The operation may further include appending the second data set to an overall data set that includes at least the data set of one or more emotions over the first time period. The operation may further include generating an updated sentiment value corresponding to the overall sentiment of the facility, spanning the first time period and the second time period, based on the appended data set. The operation may further include outputting the updated sentiment of the facility based on the generated updated sentiment value.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on some embodiments without specific recitation.

DETAILED DESCRIPTION

The present disclosure generally relates to a method and system for determining an overall sentiment of the facility. The methods discussed herein provide a dynamic approach for a business to identify how patrons perceive the business. For example, the methods discussed herein leverage data captured by one or more recording devices positioned in the facility to analyze one or more audio or visual cues exhibited by patrons of the facility. By analyzing the one or more audio or visual cues exhibited by patrons, the methods disclosed herein may generate an overall sentiment of the facility that represents the patrons' overall mood, attitude, or reaction to the facility.

Still further, methods discussed herein allow a business to segment its facility for a more granular sentiment analysis of the facility. For example, by segmenting the facility, a business can pinpoint weaknesses or strengths of the business' structure or service. Thus, in addition to generating an overall sentiment of the facility based on the analysis, the methods disclosed herein allow the business to determine a localized sentiment directed to certain aspects of the facility, such as, but not limited to, ordering line, condiment table, seating area, and the like.

The sentiment analysis can provide benefits to both the business and the consumers. For the business, the sentiment analysis can provide a critique of the business' structure and service, thereby allowing the business to improve its weaknesses. Further, the sentiment analysis provides a real time determination of how patrons perceive the business structure and service of the business, eliminating a post-hoc review posted to the Internet by one or more patrons. For the consumer, the sentiment analysis can provide a different aspect to the business review process as compared to those previously existing systems. As such, the consumer can view reviews of the restaurant that are based on patrons' emotions exhibited in the facility.

Figure 1:
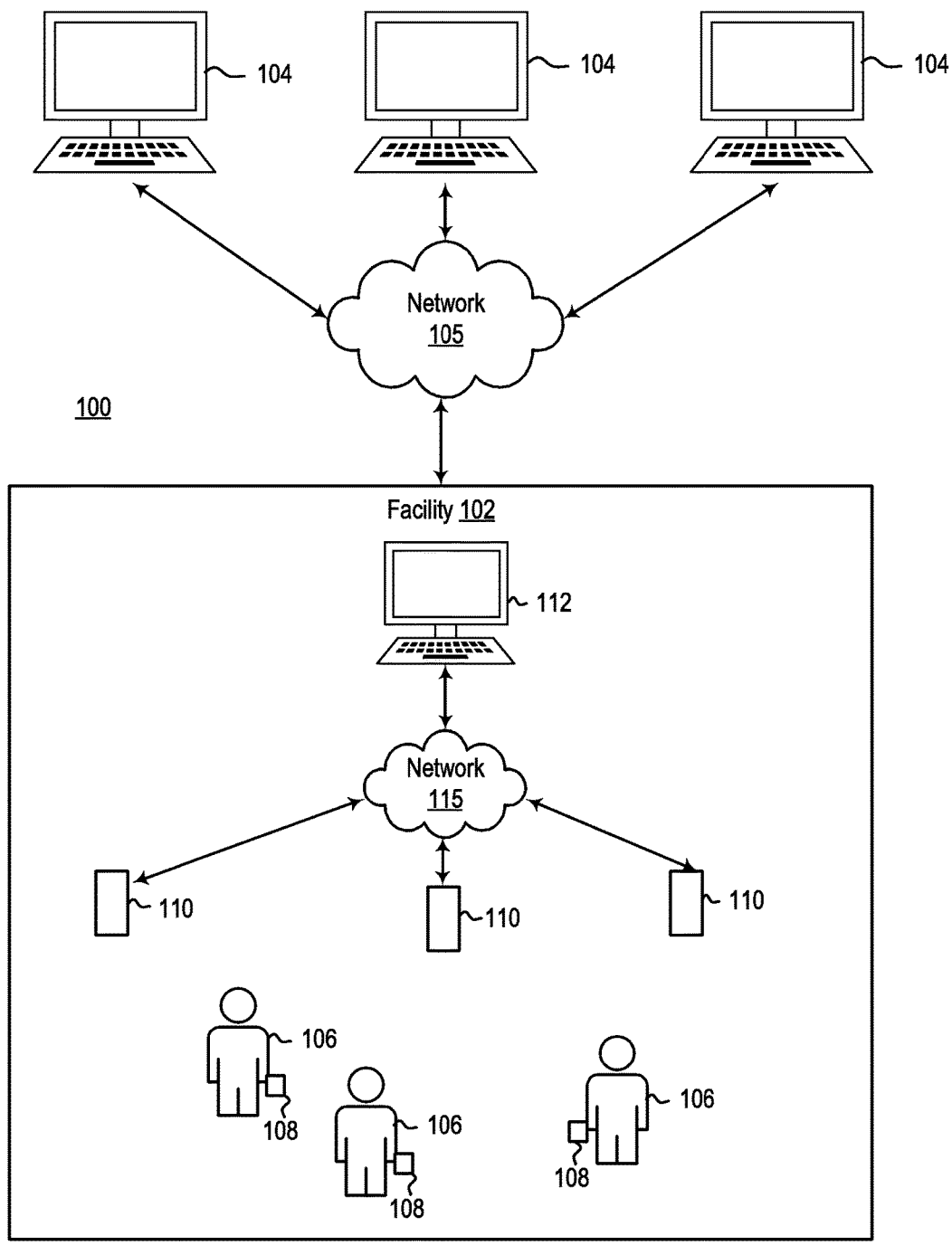
FIG. 1 is a block diagram illustrating a computing environment, according to one embodiment.

FIG. 1 is a block diagram illustrating a computing environment 100, according to one embodiment. Computing environment 100 includes on-site components 101 and off-site components 103 communicating over network 105. On-site components 101 may be positioned within a facility 102. In some embodiments, facility 102 may be a restaurant, a fast food establishment, a coffee shop, an ice cream parlor, and the like. Generally, facility 102 may be any service driven business model for which reviews are typically generated.

Facility 102 includes one or more data recording devices 110 and an on-site computing system 112. One or more data recording devices 110 are in communication with on-site computing system 112 via a network 115. Each of one or more data recording devices 110 may be any device capable of recording at least one of audio or visual information. For example, one or more data recording devices 110 may include a microphone device capable of recording audio information in facility 112. In another example, one or more data recording devices 110 may include a camera that is capable of recording visual information in facility. In some embodiments, one or more data recording devices 110 may include a camera that is capable of recording both audio and visual information.

Each data recording devices 110 is positioned within facility 102 to capture audio and visual cues performed by each of one or more patrons 106 of the facility 102. For example, each of one or more data recording devices 110 are positioned within facility 102 to capture a sentiment of each of one or more patrons 106 that is exhibited through one or more visual cues performed by each patron 106. For example, each data recording device 110 may capture at least one or more of body language of each patron 106, words spoken by each patron 106, lip movements of each patron 106, visual gestures of each patron 106, and the like.

In some embodiments, on-site components 101 may further include personal computing devices 108 of each patron 106. Each personal computing device 108 may include an application installed thereon that gives the application permission to record at least one of audio and visual cues. For example, the application installed on personal computing device 108 may receive permission to activate a camera and/or microphone of computing device 108 when application determines (e.g., through location services) that patron 106 is inside (or near) facility 102. Similar to data recording devices 110, when activated, personal computing device 108 records a data stream that includes at least one of audio and visual information.

The streams of data recorded by each data recording device 110 and each personal computing device 108 may be transmitted off-site. Off-site components 103 generally include one or more computing devices 104. Each computing device 104 is configured to receive at least a portion of the streams of data transmitted by each recording device 110 and each computing device 108. In some embodiments, data recording devices 110 and personal computing devices 108 transmit the streams of data to computing devices 104 in real-time (or near real-time). In other embodiments, data recording devices 110 and personal computing devices 108 transmit the streams of data to computing devices 104 periodically. For example, data recording devices 110 and personal computing devices 108 may transmit the streams of data to computing devices 104 at pre-determined times throughout a day, week, etc.

Computing device 104 processes the streams of data to determine an overall sentiment of the facility. In other words, computing device 104 processes the streams of data to determine an overall mood, attitude, or reaction to facility 102, based on an aggregation of sentiments of patrons 106.

Figure 2:
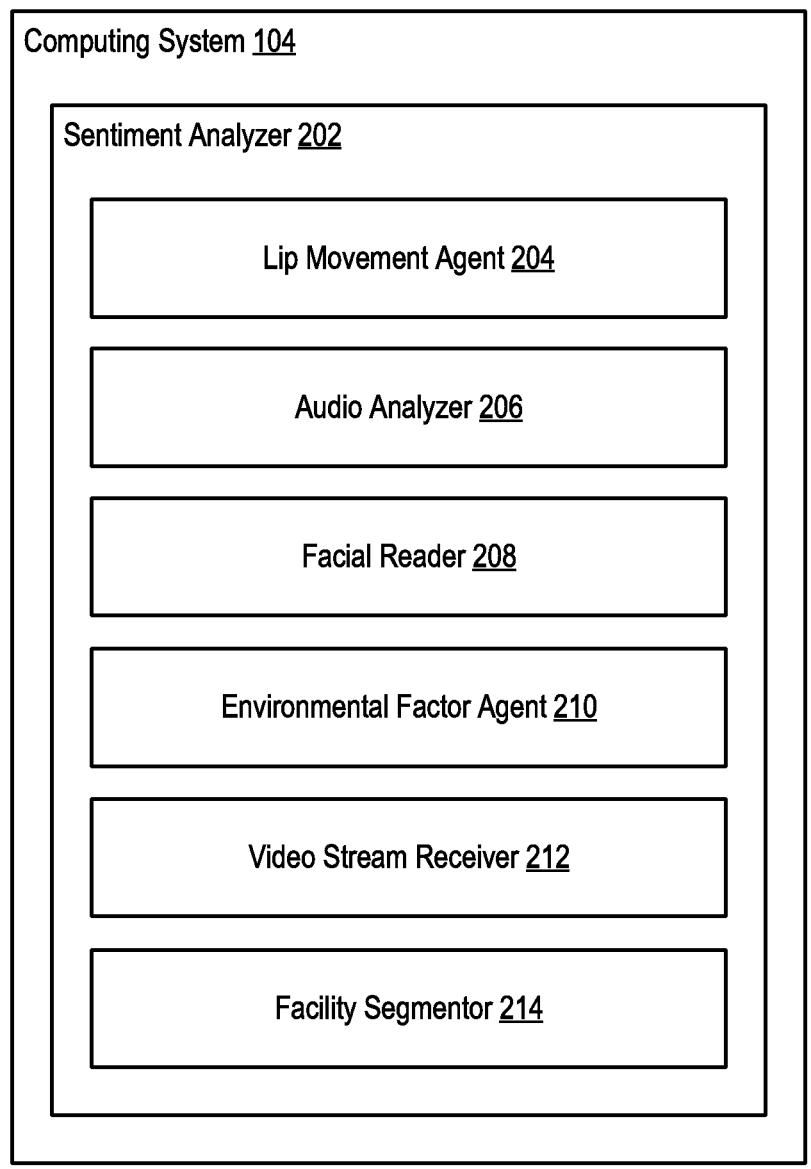
FIG. 2 is a block diagram illustrating computing system of the computing environment of FIG. 1 in more detail, according to one embodiment.

FIG. 2 is a block diagram illustrating computing device 104 in more detail, according to one embodiment. Computing device 104 may include sentiment analyzer 202. Sentiment analyzer 202 is configured to process one or more streams of data to determine the overall sentiment of facility 102. Sentiment analyzer 202 may include lip movement agent 204, audio analyzer 206, facial reader 208, environmental factor agent 210, video stream receiver 212, and facility segmentor 214.

Data stream receiver 212 may be configured to receive one or more data streams from one or more data recording devices 110. In some embodiments, data stream receiver 212 may be further configured to receive one or more data streams from one or more personal computing devices 108 of one or more patrons 106. Data stream receiver 212 may partition each of one or more data streams into a plurality of frames. Partitioning the one or more data streams into a plurality of frames aids in more accurately identifying a sentiment of one or more patrons 106, in part, by slowing down the one or more data streams and analyzing the data streams over smaller, discrete time periods.

Lip movement agent 204 is configured to analyze a lip movement of each patron 106 in the one or more streams of data. In each frame of video, lip movement agent 204 may map a location of a patron's 106 lip over time. Based on the change of location of a patron's lip, lip movement agent 204 may be able to determine a word spoken by patron 106. Such functionality aids in determining a sentiment of a user in situations where only visual information is captured in the one or more streams of data. Further, such functionality may aid in determining words said by patron 106 in situations where both visual and audio information is captured in the one or more streams of data. For example, in embodiments when facility 102 includes many patrons 106, it may be difficult for sentiment analyzer 202 to identify words said by patrons 106. In these embodiments, lip movement agent 204 aids in accurately identifying words said, by not having to factor into filtering "cross-talk" between two or more patrons 106. The process carried out by lip movement agent 204 to map lip movements to one or more words is discussed in more detail below, in conjunction with FIG. 5.

Audio analyzer 206 is configured to analyze one or more visual cues included in the one or more streams of data. For example, audio analyzer 206 may parse the streams of data into one or more frames of audio (or audio and video). In each frame of audio, audio analyzer may determine one or more words spoken by patrons 106. For example, audio analyzer 206 may use voice recognition software to identify one or more words spoken by patrons 106. In some embodiments, audio analyzer 206 may work in conjunction with one or more components of sentiment analyzer 202 to associate particular words with a given patron. For example, audio analyzer 206 may provide a confirmation that the word predicted by lip movement agent 204. The process carried out by audio analyzer 206 to decipher words recited by patrons 106 in the facility 102 is discussed in more detail below, in conjunction with FIG. 7.

Facial reader 208 is configured to analyze facial expression of each patron 106 in the one or more streams of data. For example, facial reader 208 may partition the streams of data into one or more frames of video. Facial reader 208 may place one or more plot points on one or more points of interest on the face of patron 106. Facial reader 208 may then compare the face of patron 106 to a database of facial expressions using the one or more plot points. Based on this comparison, facial reader 208 is able to determine an expression of patron 106 over a period of time. The process carried out by facial reader 208 to identify a sentiment expressed by patron 106 through body language is discussed in more detail below, in conjunction with FIG. 6.

Environmental factor agent 210 may be in communication with one or more external feeds. Each of the one or more external feeds may be directed to one or more of weather, current events, and various other environmental factors. Further, environmental factor agent 210 may track a current time of day, current date, current season, upcoming holiday, and the like. Environmental factor agent 210 takes into account one or more environmental factors when generating an overall sentiment of the facility. For example, environmental factor agent 210 may apply a different weight to the overall sentiment analysis for facility 102, responsive to determining that there are blizzard conditions outside. Thus, rather than determining that patrons 106 are expressing a negative sentiment towards facility 102, environmental factor agent 210 may attribute the negative sentiment towards blizzard conditions. Similarly, environment factor agent 210 may apply a different weight to the overall sentiment analysis for facility 102, responsive to determining that the current day is Thanksgiving. Thus, rather than determining that patrons 106 are expressing an overly positive sentiment toward facility 102, environmental factor agent 210 may attribute a portion of the overtly positive sentiment towards the Thanksgiving holiday.

Facility segmentor 214 may be configured to segment facility 102 into one or more locations. By segmenting facility 102 into one or more locations, sentiment analyzer 202 may be able to generate an overall sentiment for each location in facility 102, thereby providing a more accurate determination of the overall sentiment of facility 102. In some embodiments, facility segmentor 214 may strategically segment a facility 102 into one or more locations, such that each location is attributed to a particular service of facility 102. For example, facility segmentor 214 may segment a coffee shop into three locations: a first location that encompasses the ordering line, a second location that encompasses a coffee add-on station, and a third location that encompasses the seating location for patrons. Such segmentation allows for sentiment analyzer to pinpoint an overall sentiment of patrons 106 in each location of facility 102. For example, an overall sentiment for the first location encompassing the ordering line may be fairly negative, while an overall sentiment for the third location encompassing the seating area for patrons 106 may be positive. This may correspond to slower ordering lines, which may be improved by adding staff members to an ordering counter.

Referring back to FIG. 1, in some embodiments, on-site components 101 may further include one or more computing systems 112. In some embodiments, computing systems 112 may be in communication with at least one or more data recording devices 110 over network 115. Computing systems 112 may be substantially similar to computing systems 104 of off-site components 103. In some embodiments, computing systems 112 may include sentiment analyzer 202, and rather than transmit one or more data streams to off-site components 103, processing may be performed on-site in facility 102. In some embodiments, computing systems 112 may include a portion of the components of sentiment analyzer 202. For example, computing systems 112 may include facility segmentor 214, and all segmentation of facility 102 is performed on-site.

Figure 3A:
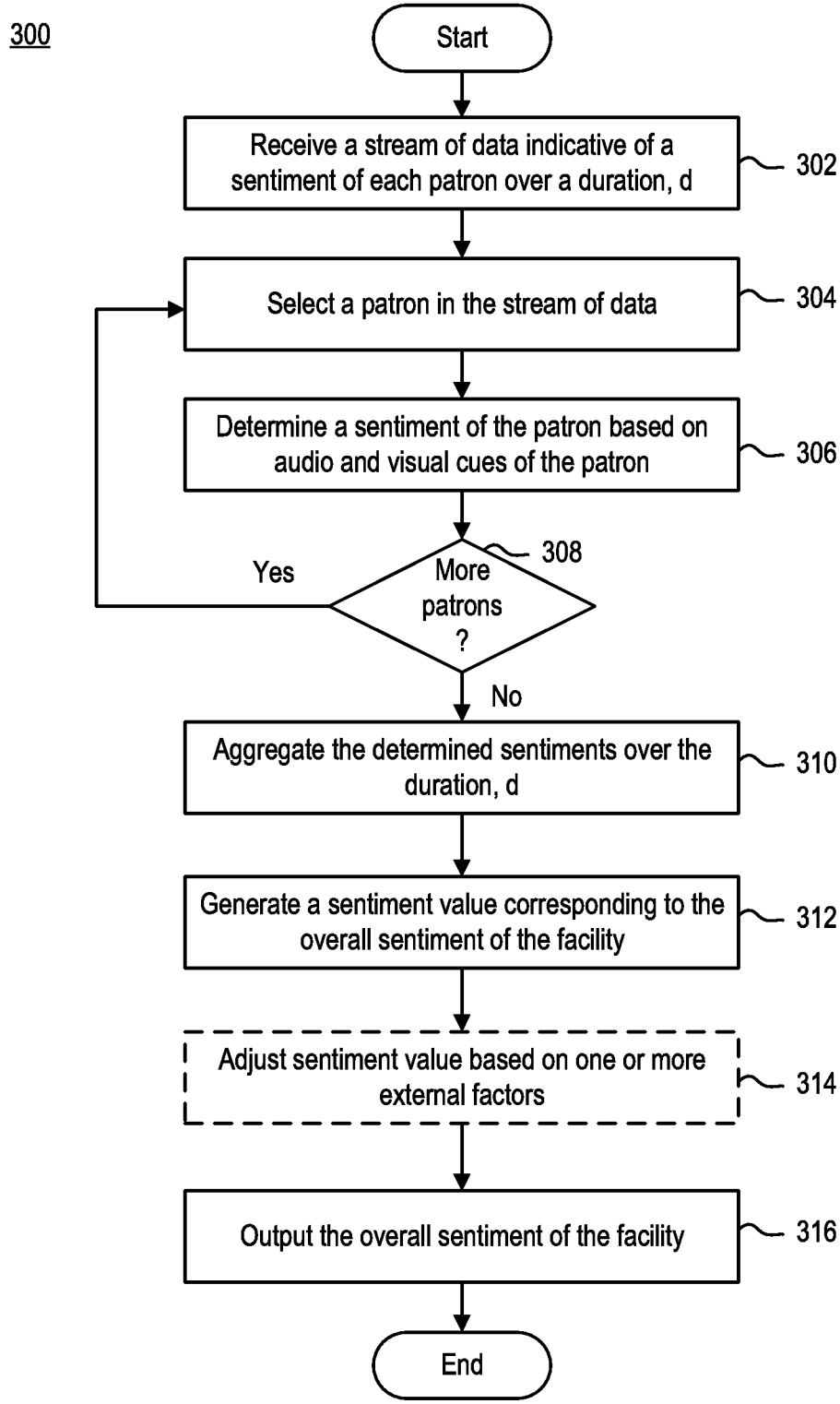
FIG. 3A is a flow diagram illustrating a method of determining an overall sentiment of a facility, according to one embodiment.

FIG. 3A is a flow diagram illustrating a method 300 of determining an overall sentiment of a facility, according to one embodiment. Although method 300 is discussed in conjunction with computing system 104, those skilled in the art would readily understand that at least a subset of steps in method 300 may be performed by computing system 112.

Method 300 begins at step 302. At step 302, computing system 102 receives a stream of data indicative of a sentiment of each patron of a duration, d. For example, data stream receiver 212 of sentiment analyzer 202 may receive one or more streams of data from facility 102. In some embodiments, data stream receiver 212 may receive one or more streams of data exclusively from data recording devices 110. In some embodiments, data stream receiver 212 may receive one or more streams of data exclusively from personal computing devices 108 of patrons 106 in facility 102. In some embodiments, data stream receiver 212 may receive one or more streams of data from both data recording devices 110 and personal computing devices 108.

At step 304, sentiment analyzer 202 selects a first patron 106 in the data stream. For example, the one or more data streams may include one or more video data streams depicting patrons 106. Sentiment analyzer 202 selects a first patron 106 depicted in the one or more video data streams. For example, sentiment analyzer 202 can focus on a first patron 106 in the one or more video data streams over the duration, d.

At step 306, sentiment analyzer 202 can determine a sentiment of selected patron 106 based on one or more audio or visual cues of selected patron 106. For example, sentiment analyzer 202 may determine a sentiment of selected patron 106 by assigning a numerical value to patron 106 corresponding to the sentiment of patron 106. In some embodiments, numerical value may be a value between one and one-hundred. In some embodiments, numerical value may be a value between one and five. In some embodiments, numerical value may be binary, either zero or one. Sentiment analyzer 202 may determine a sentiment of selected patron 106 based on one or more of body language, lip movement, audio recordings, or facial expressions of patron 106 over duration, d. In some embodiments, lip movement agent 204 determines a sentiment of selected patron 106 by mapping lip movement of patron 106 to one or more words. In some embodiments, audio analyzer 206 determines a sentiment of selected patron 106 by analyzing an audio stream to determine one or more words spoken by patron 106. In some embodiments, body language analyzer 208 determines a sentiment of selected patron by mapping one or more bodily movements of patron to one or more gestures. Those skilled in the art would readily understand that lip movement agent 204, audio analyzer 206, and body language analyzer 208 may work in conjunction to determine the sentiment of selected patron 106.

At step 308, sentiment analyzer 202 determines whether there are any remaining patrons 106 in the one or more data streams for which a sentiment has not been determined. If there are more patrons 106 in the one or more data streams for which a sentiment has not been determined, method 300 reverts to step 304 for selection of one of the remaining patrons 106. If, however, sentiment analyzer determines that a sentiment has been determined for each patron 106 in the one or more data streams, method 300 proceeds to step 310.

At step 310, sentiment analyzer 202 aggregates the sentiments of all patrons 106 captured in the one or more data streams over the first duration d. For example, sentiment analyzer 202 may aggregate the numerical values corresponding to the sentiments of each patron 106 in a data set.

At step 312, sentiment analyzer 202 generates an overall sentiment value corresponding to the overall sentiment of the facility. For example, sentiment analyzer 202 generates the overall sentiment value based on the data set of individual sentiment values of each patron 106. Sentiment analyzer 202 may generate the overall sentiment value based an analysis of the data set. For example, in a binary system, sentiment analyzer 202 may determine an overall sentiment value of 0 or 1, based on which individual sentiment value occurred most frequently. In other examples, sentiment analyzer 202 may determine an overall sentiment value (regardless of scale) by taking an average of the individual sentiment values in the data set.

In some embodiments, method 300 may further include step 314. At step 314, sentiment analyzer may adjust the overall sentiment value based on one or more external factors. For example, sentiment analyzer 202 may leverage environmental factor agent 210 to more accurately determine the sentiment of selected patron 106. Environmental factor agent 210 may apply one or more weights to the overall sentiment value that takes into account one or more environmental factors, irrespective of facility 102, that may affect the sentiment of selected patron 106. For example, environmental factor agent 210 may adjust a low scoring overall sentiment value, responsive to determining that the weather is particularly cold that day. In another example, environment factor agent 210 may adjust a high scoring overall sentiment value, responsive to determining that facility 102 has a 2 for 1 promotion that day.

At step 316, sentiment analyzer 202 outputs the overall sentiment of the facility based on the overall sentiment value. For example, sentiment analyzer 202 may post the overall sentiment of facility 102 on a social media site of facility 102. In another example, sentiment analyzer 202 may post the overall sentiment of facility 102 on a dedicated site maintained by computing systems 104.

Figure 3B:
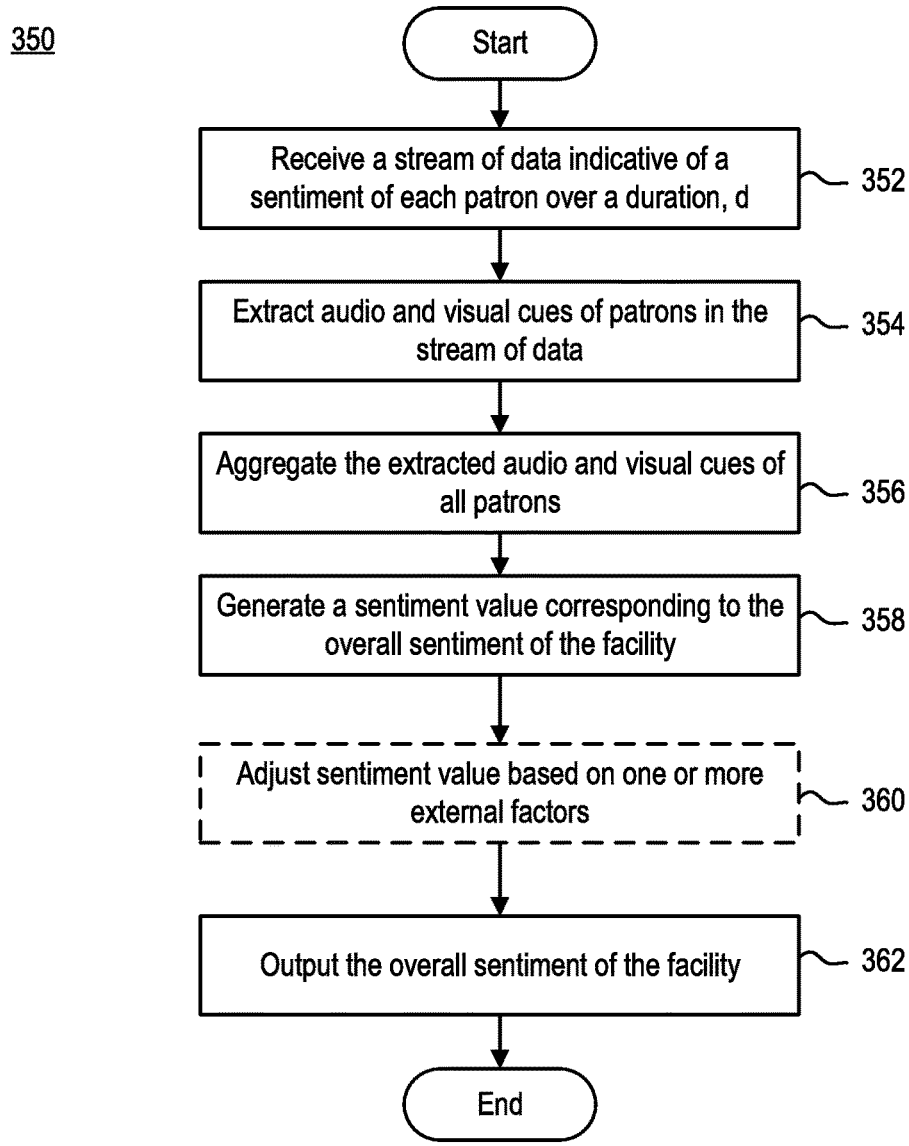
FIG. 3B is a flow diagram illustrating a method of determining an overall sentiment of a facility, according to one embodiment.

FIG. 3B is a flow diagram illustrating a method 350 of determining an overall sentiment of a facility, according to one embodiment. Method 350 is substantially similar to method 300. Although method 350 is discussed in conjunction with computing system 104, those skilled in the art would readily understand that at least a subset of steps in method 350 may be performed by computing system 112.

Method 350 begins at step 352. At step 352, computing system 102 receives a stream of data indicative of a sentiment of each patron of a duration, d. For example, data stream receiver 212 of sentiment analyzer 202 may receive one or more streams of data from facility 102 that includes at least one of streams from data recording devices 110 and streams from personal computing devices 108.

At step 354, sentiment analyzer 202 extracts audio or visual cues of patrons 106 in the data stream. For example, rather than focus on patrons 106 on an individualized basis and generate an individualized sentiment value, sentiment analyzer 202 extracts all audio and visual cues of patrons 106 from the data stream, regardless of patron 106. Such analysis may be useful, for example, when words cannot be attributed to certain patrons 106 in a video stream or in situations where the data stream includes only audio.

At step 356, sentiment analyzer 202 aggregates the extracted audio and visual cues of all patrons 106 captured in the one or more data streams over the first duration d. For example, sentiment analyzer 202 may aggregate one or more of words spoken, bodily gestures, and lip movements of one or more patrons 106.

At step 358, sentiment analyzer 202 generates an overall sentiment value corresponding to the overall sentiment of the facility. Sentiment analyzer 202 may generate the overall sentiment value based on the extracted audio and visual cues of all patrons 106. For example, sentiment value may total the number of detected positive audio and visual cues and a number of detected negative audio and visual cues. In another example, sentiment analyzer 202 may assign a numerical value to each extracted audio and visual cue, and subsequently average the numerical values to generate an overall sentiment value.

In some embodiments, method 350 may further include step 360. At step 360, sentiment analyzer may adjust the overall sentiment value based on one or more external factors. For example, sentiment analyzer 202 may leverage environmental factor agent 210 to more accurately determine the overall sentiment. Environmental factor agent 210 may apply one or more weights to the overall sentiment value that takes into account one or more environmental factors, irrespective of facility 102, that may affect the overall sentiment of patrons 106. For example, environmental factor agent 210 may adjust a low scoring overall sentiment value, responsive to determining that the weather is particularly cold that day. In another example, environment factor agent 210 may adjust a high scoring overall sentiment value, responsive to determining that facility 102 has a 2-for-1 promotion that day.

At step 362, sentiment analyzer 202 outputs the overall sentiment of the facility based on the overall sentiment value. For example, sentiment analyzer 202 may post the overall sentiment of facility 102 on a social media site of facility 102. In another example, sentiment analyzer 202 may post the overall sentiment of facility 102 on a dedicated site maintained by computing systems 104.

Figure 4:
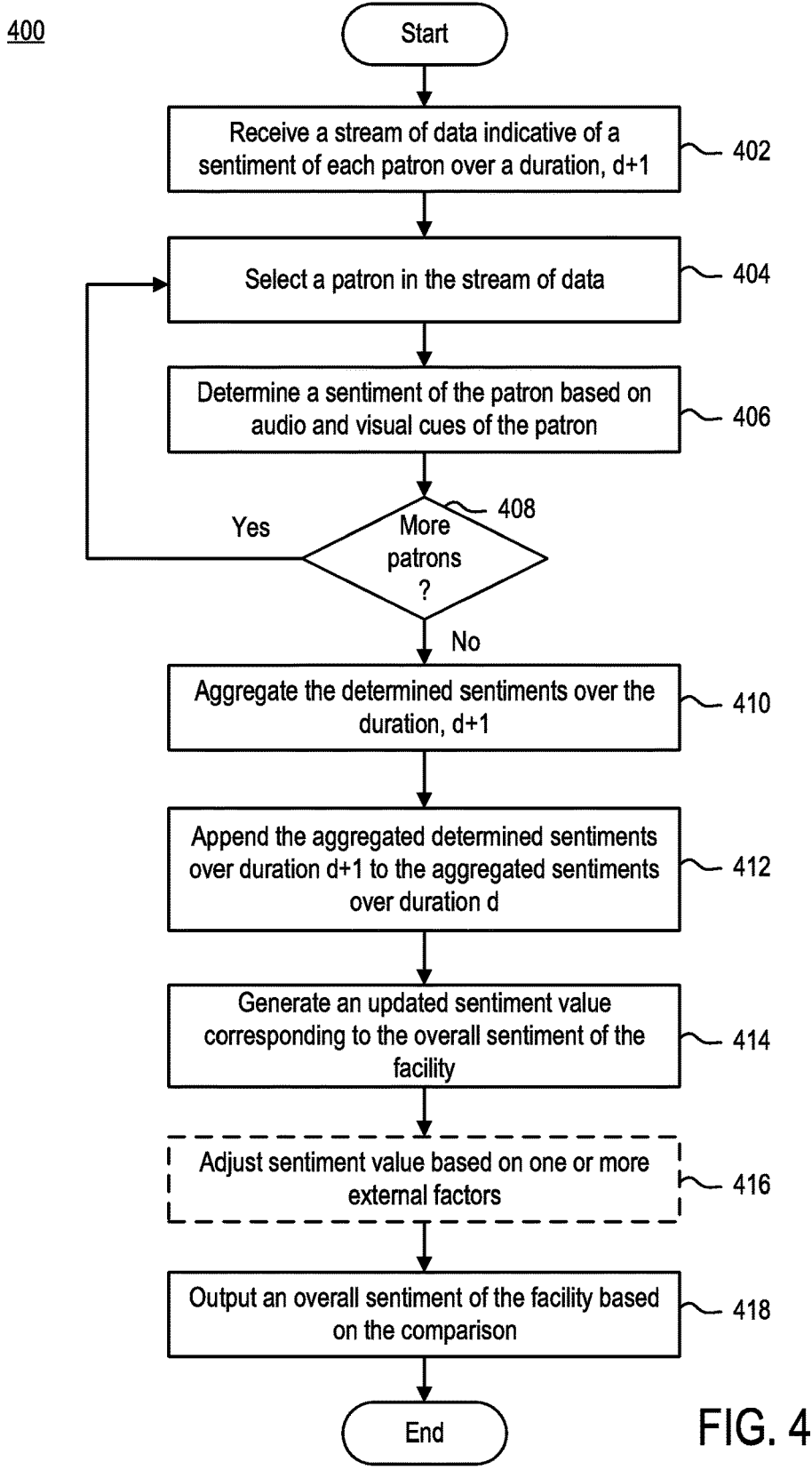
FIG. 4 is a flow diagram illustrating a method of determining an overall sentiment of a facility, according to one embodiment.

FIG. 4 is a flow diagram illustrating a method of determining an overall sentiment of a facility, according to one embodiment. Although method 400 is discussed in conjunction with computing system 104, those skilled in the art would readily understand that at least a subset of steps in method 400 may be performed by computing system 112.

Method 400 begins at step 402. At step 402, computing system 102 receives a stream of data indicative of a sentiment of each patron of a duration, d+1. The duration d+1 may be at a time subsequent to duration, d, in FIG. 3A. Generally, data stream receiver 212 of sentiment analyzer

202 may receive one or more streams of data from facility 102. The one or more streams of data may include one or more streams of data from at least one of data recording devices 110 and personal computing devices 108.

At step 404, sentiment analyzer 202 selects a first patron 106 in the data stream. For example, the one or more data streams may include one or more video data streams depicting patrons 106. Sentiment analyzer 202 selects a first patron 106 depicted in the one or more video data streams. For example, sentiment analyzer 202 focuses on a first patron 106 in the one or more video data streams over the duration, d+1.

At step 406, sentiment analyzer 202 determines a sentiment of selected patron 106 based on one or more audio or visual cues of selected patron 106. For example, sentiment analyzer 202 may determine a sentiment of selected patron 106 by assigning a numerical value to patron 106 corresponding to the sentiment of patron 106. Sentiment analyzer 202 may determine a sentiment of selected patron 106 based on one or more of body language, lip movement, audio recordings, or facial expressions of patron 106 over duration, d+1.

At step 408, sentiment analyzer 202 determines whether there are any remaining patrons 106 in the one or more data streams for which a sentiment has not been determined. If there are more patrons 106 in the one or more data streams for which a sentiment has not been determined, method 400 reverts to step 404 for selection of one of the remaining patrons 106. If, however, sentiment analyzer determines that a sentiment has been determined for each patron 106 in the one or more data streams, method 400 proceeds to step 410.

At step 410, sentiment analyzer 202 aggregates the sentiments of all patrons 106 captured in the one or more data streams over the first duration d. For example, sentiment analyzer 202 may aggregate the numerical values corresponding to the sentiments of each patron 106 in a data set.

At step 412, sentiment analyzer 202 appends the aggregated sentiment values over duration, d+1, to the aggregated sentiment values over duration, d. For example, computing system 104 may maintain a database of sentiment values for a plurality of time periods. Sentiment analyzer 202 may continually append new sentiment values to the database, which may be used to generate an updated overall sentiment value of facility 102.

At step 414, sentiment analyzer 202 generates an updated overall sentiment value corresponding to an updated overall sentiment of the facility. For example, sentiment analyzer 202 generates the updated overall sentiment value based on the data set of individual sentiment values that now includes the individualized sentiment values over duration d+1. Sentiment analyzer 202 may generate the overall sentiment value based an analysis of the data set.

In some embodiments, method 400 may further include step 416. At step 416, sentiment analyzer may adjust the updated overall sentiment value based on one or more external factors. For example, sentiment analyzer 202 may leverage environmental factor agent 210 to more accurately determine the updated overall sentiment of facility 102. Environmental factor agent 210 may apply one or more weights to the updated overall sentiment value that takes into account one or more environmental factors, irrespective of facility 102, that may affect the sentiment of patrons 106.

At step 418, sentiment analyzer 202 outputs the updated overall sentiment of the facility based on the updated overall sentiment value. For example, sentiment analyzer 202 may post the updated overall sentiment of facility 102 on a social media site of facility 102. In another example, sentiment analyzer 202 may post the updated overall sentiment of facility 102 on a dedicated site maintained by computing systems 104.

Figure 5:
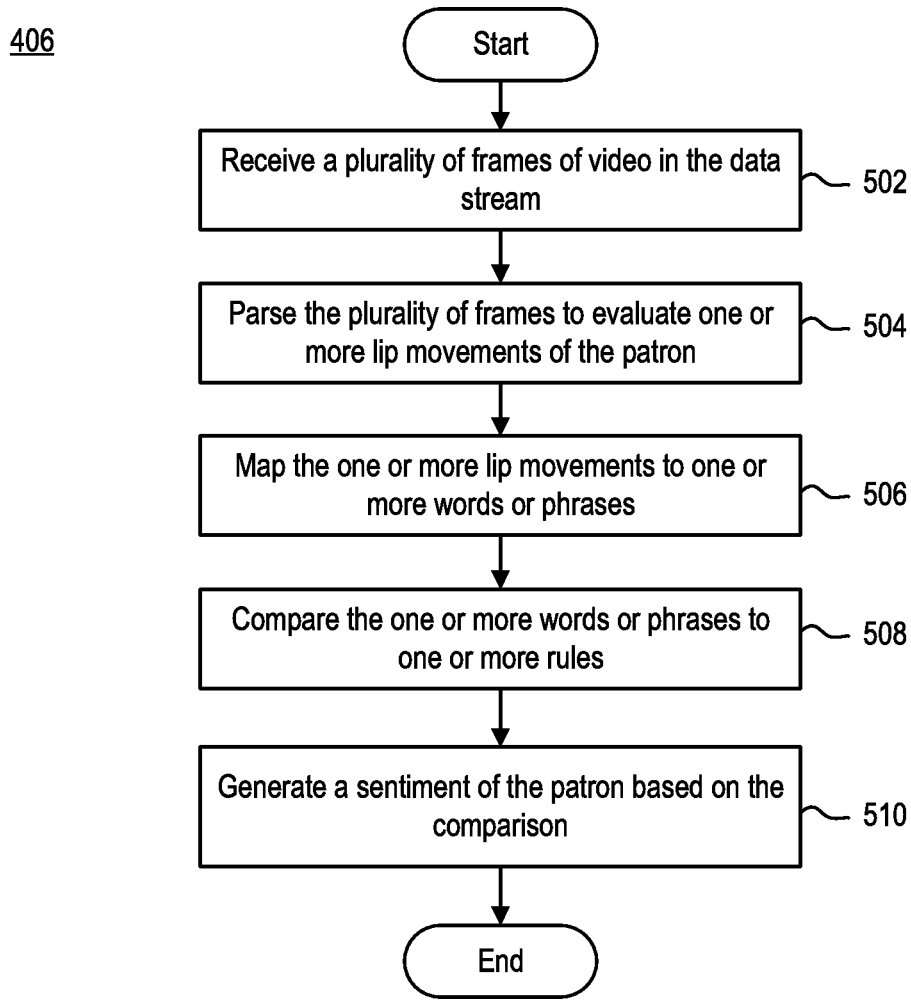
FIG. 5 is a flow diagram illustrating a step of the method of FIG. 4 in more detail, according to one embodiment.

FIG. 5 is a flow diagram illustrating step 406 of method 400 of FIG. 4 in more detail, according to one embodiment. FIG. 5 illustrates only one example of how sentiment analyzer 202 determines a sentiment of a patron. Those skilled in the art would readily understand that the steps discussed below in conjunction with FIG. 5 may factor into at least a portion of the sentiment analysis.

At step 502, lip movement agent 204 receives a plurality of frames of video from one or more data streams. For example, in some embodiments, sentiment analyzer 202 may receive one or more data streams that include one or more frames of video and one or more frames of audio. For purposes of analyzing lip movement of a patron 106, lip movement agent 204 requires at least the plurality of frames of video.

At step 504, lip movement agent 204 parses the plurality of frames to evaluate one or more lip movements of patron 106. For example, lip movement agent 204 may track lip movement of a patron 106 over discrete subsets of the plurality of frames. In some embodiments, lip movement agent 204 may position one or more plot points on one or more interest points of patron's lips to evaluate the lip movements.

At step 506, lip movement agent 204 maps the one or more lip movements to one or more words or phrases. For example, after lip movement agent 204 tracks lip movements of a patron 105, lip movement agent 204 compares the identified lip movements to one or more words or phrases. Lip movement agent 204 then maps subsets of the plurality of frames to the identified one or more words or phrases.

At step 508, lip movement agent 204 compares the one or more words or phrases to one or more rules. For example, once lip movement agent 204 has a set of words or phrases uttered by patron 106, lip movement agent 204 compares the set of words or phrases to one or more rules to determine whether the one or more words or phrases correspond to a particular sentiment. In some embodiments, lip movement agent 204 applies each individual word to a rule. In some embodiments, lip movement agent 204 applies subsets of individual words (i.e., phrases) to one or more rules.

At step 510, lip movement agent 204 generates an individualized sentiment of the patron based on the comparison. For example, lip movement agent 204 may determine that patron 106 predominately uttered words that were determined to be negative during the comparison. As a result, lip movement agent generates an individualized sentiment that corresponds to a negative sentiment. In some embodiments, lip movement agent 204 may provide a more refined output. For example, lip movement agent 204 may determine a degree of negativity (or positivity) of patron's 106 sentiment based on the comparison.

Figure 6:
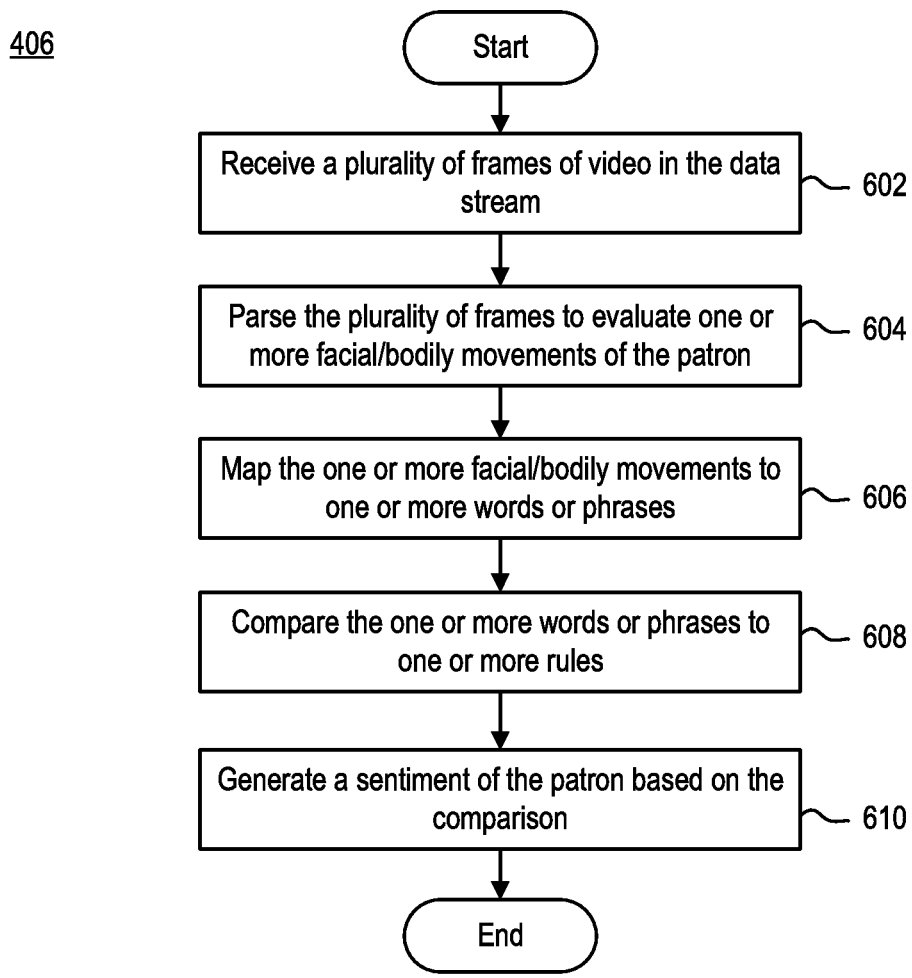
FIG. 6 is a flow diagram illustrating a step of the method of FIG. 4 in more detail, according to one embodiment.

FIG. 6 is a flow diagram illustrating step 406 of method 400 of FIG. 4 in more detail, according to one embodiment. FIG. 6 illustrates only one example of how sentiment analyzer 202 determines a sentiment of a patron. Those skilled in the art would readily understand that the steps discussed below in conjunction with FIG. 6 may factor into at least a portion of the sentiment analysis.

At step 602, body language analyzer 208 receives a plurality of frames of video from one or more data streams. For example, in some embodiments, sentiment analyzer 202 may receive one or more data streams that include one or more frames of video and one or more frames of audio. For purposes of analyzing body language of a patron 106, body language analyzer 208 requires at least the plurality of frames of video.

At step 604, body language analyzer 208 parses the plurality of frames to evaluate one or more body positions or bodily movements of patron 106. For example, body language analyzer 208 may track bodily movement of a patron 106 over discrete subsets of the plurality of frames. In another example, body language analyzer 208 may identify a position of portions of patron's body, to determine a gesture or stance of patron 106. In some embodiments, body language analyzer 208 may position one or more plot points on one or more interest points of patron's body to evaluate the body positions and/or bodily movements.

At step 606, body language analyzer 208 may map the one or more body movements or body positions to one or more default gestures. For example, after body language analyzer 208 tracks body movement or bodily position of a patron 106, body language analyzer 208 compares the identified body movements and/or bodily positions to one or more stored gestures.

At step 608, body language analyzer 208 compares the one or more gestures to one or more rules. For example, once body language analyzer 208 has a set of gestures displayed and/or performed by patron 106, body language analyzer 208 compares the set of gestures to one or more rules to determine whether the one or more gestures correspond to a particular sentiment.

At step 610, body language analyzer 208 generates an individualized sentiment of the patron based on the comparison. For example, body language analyzer 208 may determine that patron 106 predominately displayed gestures that typically correspond to negative connotations. As a result, body language analyzer 208 generates an individualized sentiment that corresponds to a negative sentiment. In some embodiments, body language analyzer 208 may provide a more refined output. For example, body language analyzer 208 may determine a degree of negativity (or positivity) of patron's 106 sentiment based on the comparison.

Figure 7:
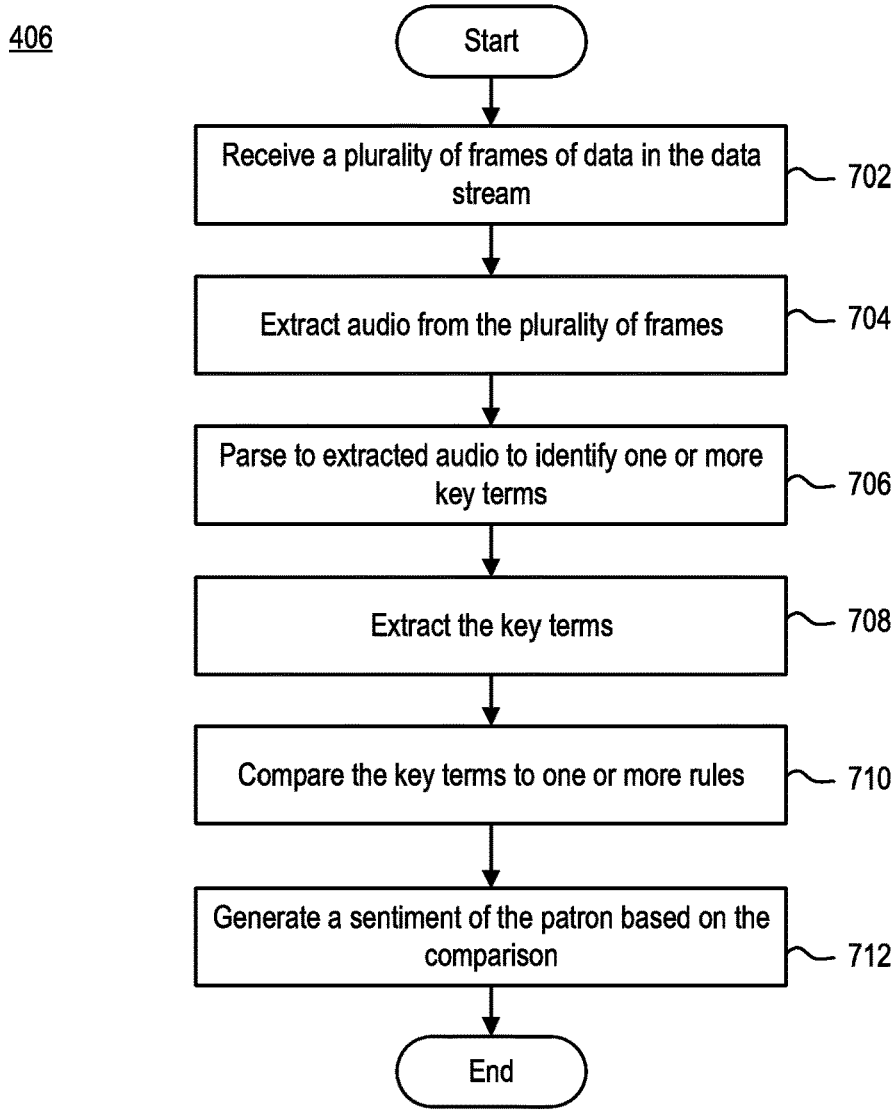
FIG. 7 is a flow diagram illustrating a step of the method of FIG. 4 in more detail, according to one embodiment.

FIG. 7 is a flow diagram illustrating step 406 of method 400 of FIG. 4 in more detail, according to one embodiment. FIG. 7 illustrates only one example of how sentiment analyzer 202 determines a sentiment of a patron. Those skilled in the art would readily understand that the steps discussed below in conjunction with FIG. 6 may factor into at least a portion of the sentiment analysis.

At step 702, audio analyzer 206 receives a plurality of frames of data from one or more data streams. In some embodiments, sentiment analyzer 202 may receive one or more data streams that include one or more frames of video and one or more frames of audio. In other embodiment, sentiment analyzer 202 may receive one or more data streams that include both video and audio. In these embodiments, at step 704, audio analyzer 206 extracts the audio portion from the one or more data streams for further analysis.

At step 706, audio analyzer 206 may parse the extracted audio to identify one or more key terms in the audio. In some embodiments, audio analyzer 206 parses the audio on and individualized basis, and associates extracted audio with an individual patron 106. In some embodiments, audio analyzer 206 parses the audio on a generalized basis, regardless of the patron 106 uttering the words. For example, audio analyzer 206 may implement any speech recognition software to identify one or more key terms in the extracted audio.

At step 708, audio analyzer 206 extracts the identified one or more key terms from the extracted audio. For example, audio analyzer 206 extracts the identified one or more key terms for a subsequent comparison of the one or more key terms. At step 710, audio analyzer 206 compares the one or more key terms to one or more rules. For example, once audio analyzer 206 has a set of extracted key terms, audio analyzer 206 compares the set of key terms to one or more rules to determine whether the one or more key terms correspond to a particular sentiment.

At step 712, audio analyzer 206 generates a sentiment of the patron based on the comparison. For example, audio analyzer 206 may determine that patron 106 predominately displayed uttered one or more key terms that typically correspond to a positive sentiment. As a result, audio analyzer 206 may generate an individualized sentiment that corresponds to a positive sentiment. In some embodiments, audio analyzer 208 may provide a more refined output. For example, audio analyzer 208 may determine a degree of negativity (or positivity) of patron's 106 sentiment based on the comparison.

Further, as evident to those skilled in the art, audio analyzer 206 may further take into account one or more of tone, volume, and context of the one or more key terms. For example, audio analyzer 206 may take into account the tone in which the one or more key terms were spoken during the comparison. In another example, audio analyzer may take into account the volume at which the one or more key terms were spoken during the comparison. In yet another example, audio analyzer 206 may take into account the context of the one or more key terms, by identifying one or more words adjacent to the one or more key terms.

Figure 8:
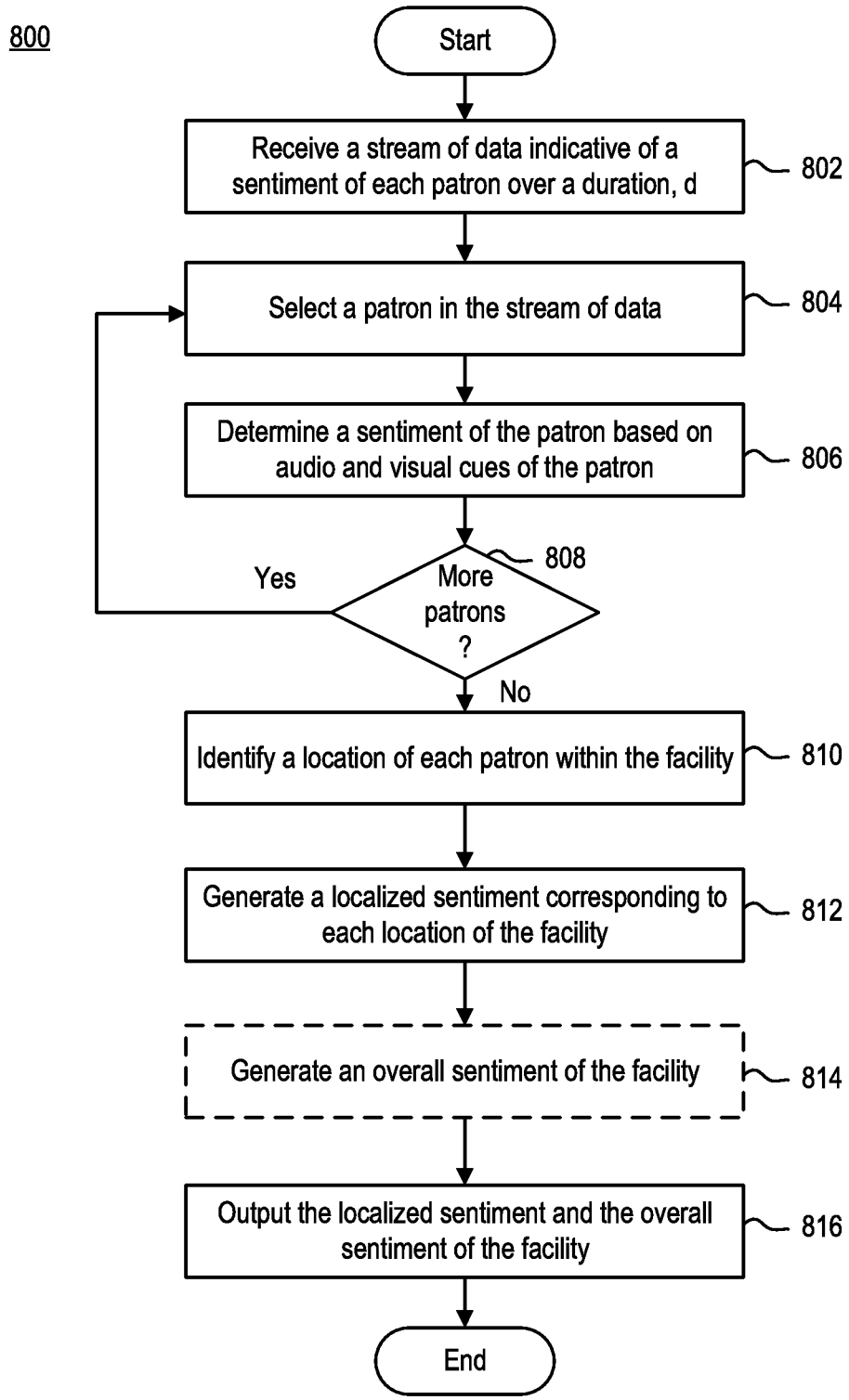
FIG. 8 is a flow diagram illustrating a method of generating a localized sentiment and overall sentiment for a facility, according to one embodiment.

FIG. 8 is a flow diagram illustrating a method 800 of determining an overall sentiment of a facility, according to one embodiment. Method 800 is substantially similar to method 300 discussed above in conjunction with FIG. 3A. Although method 800 is discussed in conjunction with computing system 104, those skilled in the art would readily understand that at least a subset of steps in method 800 may be performed by computing system 112.

Method 800 begins at step 802. At step 302, computing system 102 receives a stream of data indicative of a sentiment of each patron of a duration, d. For example, data stream receiver 212 of sentiment analyzer 202 may receive one or more streams of data from facility 102 that include at least one of audio and visual cues At step 804, sentiment analyzer 202 selects a first patron 106 in the data stream. For example, the one or more data streams may include one or more video data streams depicting patrons 106. Sentiment analyzer 202 selects a first patron 106 depicted in the one or more video data streams.

At step 806, sentiment analyzer 202 determines a sentiment of selected patron 106 based on one or more audio or visual cues of selected patron 106. For example, sentiment analyzer 202 may determine a sentiment of selected patron 106 by assigning a numerical value to patron 106 corresponding to the sentiment of patron 106. Sentiment analyzer 202 may determine a sentiment of selected patron 106 based on one or more of body language, lip movement, audio recordings, or facial expressions of patron 106 over duration, d.

At step 808, sentiment analyzer 202 determines whether there are any remaining patrons 106 in the one or more data streams for which a sentiment has not been determined. If there are more patrons 106 in the one or more data streams for which a sentiment has not been determined, method 800 reverts to step 804 for selection of one of the remaining patrons 106. If, however, sentiment analyzer determines that a sentiment has been determined for each patron 106 in the one or more data streams, method 800 proceeds to step 810.

At step 810, sentiment analyzer 202 identifies a location of each patron within facility. For example, sentiment analyzer 202 may parse the one or more data streams for visual evidence of where each patron is the facility is located. Sentiment analyzer 202 may identify the location of each patron based on the one or more segments of the facility that were defined by facility segmentor 214.

At step 812, sentiment analyzer 202 generates a localized sentiment corresponding to each segmented location of the facility. For example, sentiment analyzer 202 generates a localized sentiment value based on the individualized sentiments of each patron identified in the segmented location. Generating a localized sentiment may aid in more accurately determining the target of each patron's sentiment. For example, a negative sentiment exhibited over several patrons may be the result of a slow ordering line, as compared to the food or seating arrangement of facility.

In some embodiments, method 800 further includes step 814. At step 814, sentiment analyzer 202 may also generate an overall sentiment value corresponding to the overall sentiment of the facility. For example, sentiment analyzer 202 generates the overall sentiment value based on the data set of individual sentiment values of each patron 106. Sentiment analyzer 202 may generate the overall sentiment value based an analysis of the data set.

At step 816, sentiment analyzer 202 outputs the localized sentiments of the facility based on the localized sentiment values. For example, sentiment analyzer 202 may post the localized sentiments of facility 102 on a social media site of facility 102. In another example, sentiment analyzer 202 may post the localized sentiments of facility 102 on a dedicated site maintained by computing systems 104. In some embodiments, sentiment analyzer 202 may further output the overall sentiment of the facility based on the overall sentiment value.

Figure 9:
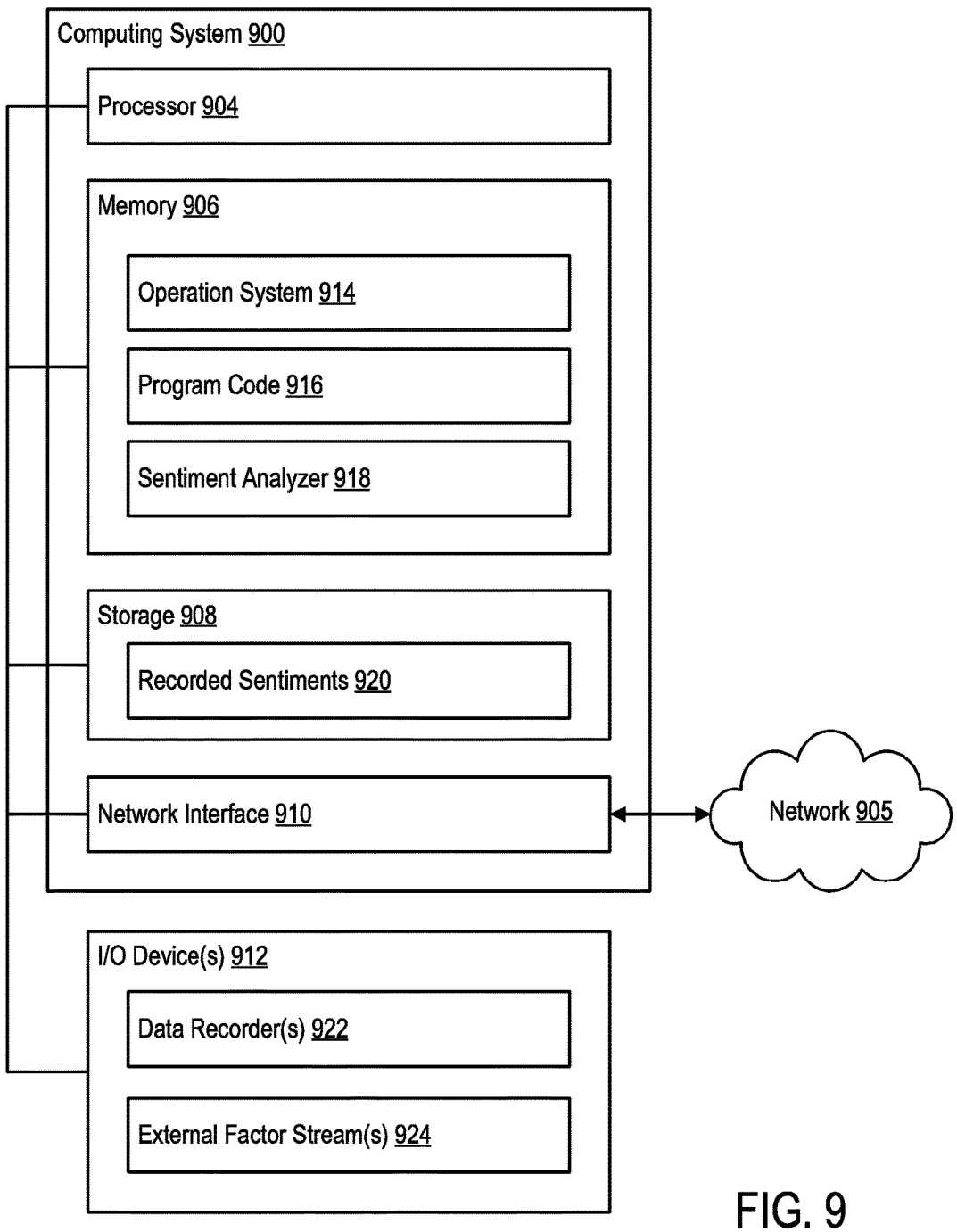
FIG. 9 is a block diagram illustrating a computing system, according to one embodiment.

FIG. 9 is a block diagram illustrating a computing system 900, according to one embodiment. In some embodiments, computing system 900 is representative of computing systems 102 in FIG. 1. In some embodiments, computing system 900 is representative of computing systems 112 in FIG. 1. Computing system 900 may include a processor 904, a memory 906, a storage 908, and a network interface 910. In some embodiments, computing system 900 may be coupled to one or more I/O device(s) 912. I/O devices 920 may include one or more data recorders 922 and one or more environmental factor streams 924. Data recorders 922 may be representative of one or more data recording devices 110. One or more environmental factor streams 924 may include one or more computing systems providing information relating to season, current date, current time, current weather, upcoming holidays, current events, and the like.

Processor 904 retrieves and executes program code 916 (i.e., programming instructions) stored in memory 906, as well as stores and retrieves application data. Processor 904 is included to be representative of a single processor, multiple processors, a single processor having multiple processing cores, and the like. Network interface 910 may be any type of network communications allowing computing system 900 to communicate externally via computing network 905.

Storage 908 may be, for example, a disk storage device. Although shown as a single unit, storage 908 may be a combination of fixed and/or removable storage devices, such as fixed disk drives, removable memory cards, optical storage, network attached storage (SAN), storage area network (SAN), and the like. As illustrated, storage 908 may include recorded sentiment values 920. In some embodiments, recorded sentiment values 920 may include a plurality of patron 106 sentiment values over discrete durations (or time periods). Recorded sentiment values 920 may be readily updated over time.

Memory 906 may include operating system 914, program code 916, and sentiment analyzer 918. Program code 916 may be accessed by processor 904 for processing (i.e., executing program instructions). Program code 916 may include, for example, steps discussed above in conjunction with FIGS. 3A-8. In a specific example, processor 904 may access program code 916 to generative an overall sentiment of facility 102. Sentiment analyzer 920 is configured to process one or more streams of data to determine the overall sentiment of a facility (e.g., facility 102). Sentiment analyzer 920 may include one or more components to determine one or more of lip movements of patrons, words spoken by patrons, body language of patrons, and any other audio of visual cues by patrons that can be linked to a particular sentiment.

Figure 10:
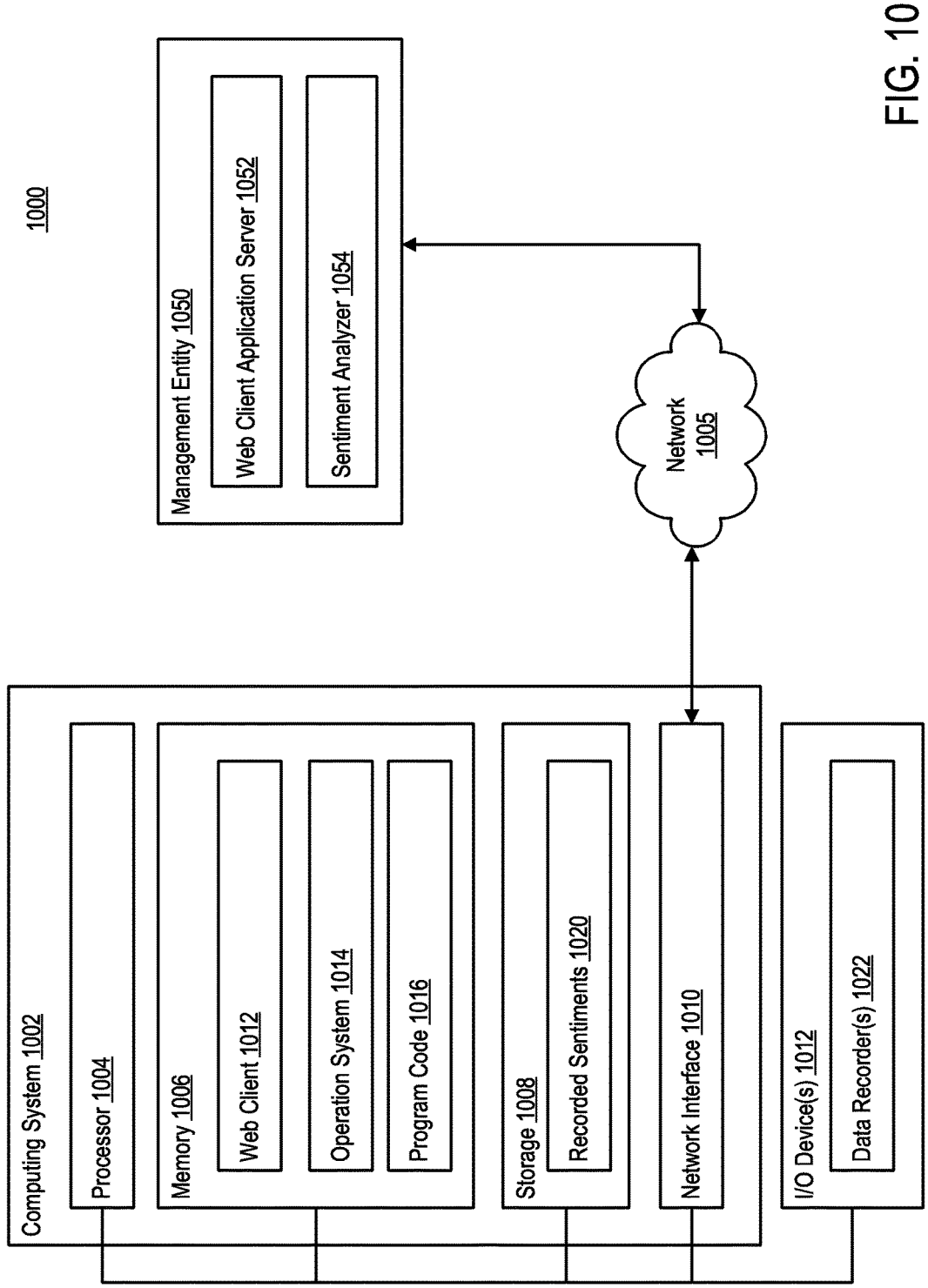
FIG. 10 is a block diagram illustrating a computing environment, according to one embodiment.

FIG. 10 is a block diagram illustrating a computing environment 1000, according to one embodiment. As illustrated, computing environment 1000 includes computing system 1002 and management entity 1050 communicating over network 1005. In some embodiments, computing system 1002 is representative of personal computing device 108 in FIG. 1 and management entity is representative of computing systems 104 in FIG. 1. Computing system 1002 may include a processor 1004, a memory 1006, a storage 1008, and a network interface 1010. In some embodiments, computing system 1000 may be coupled to one or more I/O device(s) 1012.

Processor 1004 retrieves and executes program code 1016 (i.e., programming instructions) stored in memory 1006, as well as stores and retrieves application data. Processor 1004 is included to be representative of a single processor, multiple processors, a single processor having multiple processing cores, and the like. Network interface 1010 may be any type of network communications allowing computing system 1002 to communicate externally via computing network 1005. For example, network interface 1010 allows external communication with management entity 1050.

Storage 1008 may be, for example, a disk storage device. Although shown as a single unit, storage 1008 may be a combination of fixed and/or removable storage devices, such as fixed disk drives, removable memory cards, optical storage, network attached storage (SAN), storage area network (SAN), and the like.

I/O devices 1012 may be in communication with computing system 1002. I/O devices 1012 may include one or more data recorders 1022. Data recorders 1022 may be representative of one or more microphones, front-facing cameras, or rear-facing cameras of computing system 1002.

Memory 1006 may include web client 1012, operating system 1014, and program code 1016. Program code 1016 may be accessed by processor 1004 for processing (i.e., executing program instructions). Program code 1016 may include, for example, steps for gathering one or more audio or visual cues in facility, as well as transmitting the audio and visual cues to management entity 1050. Web client 1012 allows a user of computing system 1002 to access a functionality of management entity 1050. For example, web client 1012 may content managed by web client application server 1052 on management entity 1050. The content that is displayed to a user of computing system 1002 may be transmitted from web client application server 1050 to computing system 1002, and subsequently processed by web client 1012 for display through a graphical user interface (GUI) of computing system 1002.

Management entity 1050 may be a computing system (substantially similar to computing system 900 of FIG. 9) in communication with computing system 1002. For example, management entity 1050 may receive one or more streams of data recorded by computing system 1002. Management entity 1050 further includes a sentiment analyzer 1054. Sentiment analyzer 1054 is configured to process one or more streams of data to determine the overall sentiment of a facility (e.g., facility 102). Sentiment analyzer 1054 may include one or more components to determine one or more of lip movements of patrons, words spoken by patrons, body language of patrons, and any other audio of visual cues by patrons that can be linked to a particular sentiment.

Management entity 1050 may further be in communication with database 1060. Database 1060 may include facility information 1062 for a plurality of facilities 1060. Within the information for each facility is a sentiment data set 1064, which may be updated periodically, to determine an overall sentiment of the facility.

While the foregoing is directed to embodiment described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method, comprising:

receiving one or more video streams, each video stream comprising a plurality of frames of one or more patrons in a facility over a first time period, the one or more video streams comprising data indicative of a sentiment of each of the one or more patrons, wherein the one or more video streams comprises at least a first video stream received from a camera positioned in the facility and at least a second video stream received from a patron mobile device of the one or more patrons;

for each patron in the one or more video streams, parsing the at least first video stream received from the camera positioned in the facility and the at least second video stream received from the patron mobile device to determine the sentiment of the patron based at least on audio and visual cues of the patron captured in both the at least first video stream and the at least second video stream during the first time period;

aggregating one or more sentiments corresponding to the one or more patrons in a data set indicative of an overall sentiment of the facility;

generating a sentiment value corresponding to the overall sentiment of the facility based on the data set; and outputting the overall sentiment of the facility based on the generated sentiment value.

2. The method of claim 1, wherein the sentiment of the patron comprises an attitude the patron is conveying toward the facility.

3. The method of claim 1, further comprising:

receiving one or more second video streams, each second video stream comprising a second plurality of frames of one or more patrons in the facility over a second time period succeeding the first time period, the one or more second video streams comprising data indicative of each of the one or more patrons over the second time period;

for each patron in the one or more second video streams, parsing the second plurality of frames to determine a second sentiment of the patron in the one or more second video streams based at least on audio and visual cues of the patron captured in the one or more second video streams during the second time period;

aggregating one or more second sentiments corresponding to the one or more patrons in a second data set indicative of a second overall sentiment of the facility over the second time period;

appending the second data set to an overall data set that includes at least the data set of one or more sentiments over the first time period;

generating an updated sentiment value corresponding to the overall sentiment of the facility spanning the first time period and the second overall sentiment of the facility spanning the second time period, based on the appended data set; and outputting the updated sentiment of the facility based on the generated updated sentiment value.

4. The method of claim 1, wherein for each patron in the one or more video streams, parsing the at least first video stream received from the camera positioned in the facility and the at least second video stream received from the patron mobile device to determine the sentiment of the patron based at least on audio and visual cues of the patron captured in both the at least first video stream and the at least second video stream during the first time period, comprises:

parsing the plurality of frames to identify one or more words spoken by evaluating one or more lip movements of the patron.

5. The method of claim 1, wherein for each patron in the one or more video streams, parsing the at least first video stream received from the camera positioned in the facility and the at least second video stream received from the patron mobile device to determine the sentiment of the patron based at least on audio and visual cues of the patron captured in both the at least first video stream and the at least second video stream during the first time period, comprises:

parsing the plurality of frames to identify one or more facial expressions of the patron by evaluating one or more facial movements of the patron.

6. The method of claim 1, wherein receiving the one or more video streams comprising the plurality of frames of one or more patrons in the facility over the first time period, the one or more video streams comprising data indicative of a sentiment of each of the one or more patrons, comprises:
receiving a plurality of video streams, each video stream of the plurality of video streams corresponding to a bounded location in the facility.

7. The method of claim 1, wherein for each patron in the one or more video streams, parsing the at least first video stream received from the camera positioned in the facility and the at least second video stream received from the patron mobile device to determine the sentiment of the patron based at least on audio and visual cues of the patron captured in both the at least first video stream and the at least second video stream during the first time period, comprises:
parsing the plurality of frames to identify one or more key terms, relating to one or more dimensions of the facility.

8. A method, comprising:
receiving one or more video streams, each video stream comprising a plurality of frames of one or more patrons in a facility of a first time period, the one or more video streams comprising data indicative of a sentiment of each patron over the first time period, wherein the one or more video streams comprises at least a first video stream received from a camera positioned in the facility and at least a second video stream received from a patron mobile device of the one or more patrons;
for each patron in the one or more video streams, parsing the at least first video stream received from the camera positioned in the facility and the at least second video stream received from the patron mobile device of the patron to determine the sentiment of the patron based at least on audio and visual cues of the patron captured in both the at least first video stream and the at least second video stream;
appending the sentiment of each patron captured during the first time period to an overall data set indicative of an overall sentiment of the facility for a time preceding the first time period to generate an updated data set;
generating a sentiment value corresponding to the overall sentiment of the facility based on the updated data set; and
outputting the overall sentiment of the facility based on the generated sentiment value.

9. The method of claim 8, wherein the sentiment of the patron comprises an attitude the patron is conveying toward the facility.

10. The method of claim 8, wherein for each patron in the one or more video streams, parsing the at least first video stream received from the camera positioned in the facility and the at least second video stream received from the patron mobile device of the patron to determine the sentiment of the patron based at least on audio and visual cues of the patron captured in both the at least first video stream and the at least second video stream, comprises:
parsing the plurality of frames to identify one or more words spoken by evaluating one or more lip movements of the patron.

11. The method of claim 8, wherein for each patron in the one or more video streams, parsing the at least first video stream received from the camera positioned in the facility and the at least second video stream received from the patron mobile device of the patron to determine the sentiment of the patron based at least on audio and visual cues of the patron captured in both the at least first video stream and the at least second video stream, comprises:
parsing the plurality of frames to identify one or more facial expressions of the patron by evaluating one or more facial movements of the patron.

12. The method of claim 8, wherein receiving the one or more video streams comprising the plurality of frames of one or more patrons in the facility over the first time period, the one or more video streams comprising data indicative of the sentiment of each patron, comprises:
receiving a plurality of video streams, each video stream of the plurality of video streams corresponding to a bounded location in the facility.

13. The method of claim 8, wherein for each patron in the one or more video streams, parsing the at least first video stream received from the camera positioned in the facility and the at least second video stream received from the patron mobile device of the patron to determine the sentiment of the patron based at least on audio and visual cues of the patron captured in both the at least first video stream and the at least second video stream, comprises:
parsing the plurality of frames to identify one or more key terms, relating to one or more dimensions of the facility.

14. The method of claim 13, wherein the one or more dimensions correspond to at least one of food, atmosphere, and service of the facility.

15. A system, comprising:
a processor in communication with one or more input devices, the processor receiving one or more data streams, each data stream indicative of a sentiment of each of one or more patrons in a facility, wherein the one or more data streams comprises at least a first data stream received from a patron mobile device of the one or more patrons and a second data stream received from a camera positioned in the facility; and
a memory having programming instructions stored thereon, which, when executed by the processor, performs an operation comprising:
for each patron in the one or more data streams, parsing the first data stream and the second data stream to determine the sentiment of the patron based at least on audio and visual cues of the patron captured in both the first data stream and the second data stream during a first time period;
aggregating one or more sentiments corresponding to the one or more patrons in a data set indicative of an overall sentiment of the facility;
generating a sentiment value corresponding to the overall sentiment of the facility based on the data set; and
outputting the overall sentiment of the facility based on the generated sentiment value.

16. The system of claim 15, wherein the sentiment of the patron is an attitude the patron is conveying toward the facility.

17. The system of claim 15, wherein the one or more input devices positioned in the facility, comprises:
a camera.

18. The system of claim 15, wherein the operation further comprises:
receiving a one or more second data streams of one or more patrons in the facility over a second time period succeeding the first time period, the one or more second data streams comprising data indicative of a second sentiment of each of the one or more patrons over the second time period;

for each patron in the one or more second data streams, parsing the one or more second data streams to determine the second sentiment of the patron based at least on audio and visual cues of the patron captured in the one or more second data streams;

aggregating one or more second sentiments corresponding to the one or more patrons in a second data set indicative of a second overall sentiment of the facility;

appending the second data set to an overall data set that includes at least the data set of one or more sentiments over the first time period;

generating an updated sentiment value corresponding to the overall sentiment of the facility spanning the first time period and the second overall sentiment spanning the second time period, based on the appended data set; and outputting the updated sentiment of the facility based on the generated updated sentiment value.

* * * * *